US009292160B2

(12) United States Patent
Roberts et al.

(10) Patent No.: US 9,292,160 B2
(45) Date of Patent: Mar. 22, 2016

(54) SYSTEMS AND METHODS FOR PRESENTING MEDIA PROGRAM ACCESSIBILITY INFORMATION

(71) Applicant: Verizon and Redbox Digital Entertainment Services, LLC, Basking Ridge, NJ (US)

(72) Inventors: Brian F. Roberts, Dallas, TX (US); Imran Arif Maskatia, Palo Alto, CA (US); Paul Bradley Bowers, Winfield, IL (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 103 days.

(21) Appl. No.: 14/042,706

(22) Filed: Sep. 30, 2013

(65) Prior Publication Data

US 2014/0157327 A1    Jun. 5, 2014

Related U.S. Application Data

(60) Provisional application No. 61/732,247, filed on Nov. 30, 2012.

(51) Int. Cl.
*H04N 5/445* (2011.01)
*G06F 3/0481* (2013.01)
*H04L 29/08* (2006.01)
*G06F 3/0482* (2013.01)
*H04N 21/4722* (2011.01)
*H04N 21/472* (2011.01)
*H04N 21/218* (2011.01)
*H04N 21/482* (2011.01)
*H04N 21/27* (2011.01)
*G06Q 30/02* (2012.01)
*G06Q 30/06* (2012.01)
*H04N 21/2543* (2011.01)
*H04N 21/488* (2011.01)

(52) U.S. Cl.
CPC ............ *G06F 3/0481* (2013.01); *G06F 3/0482* (2013.01); *G06Q 30/02* (2013.01); *G06Q 30/0607* (2013.01); *G06Q 30/0609* (2013.01); *H04L 67/10* (2013.01); *H04N 21/218* (2013.01); *H04N 21/2543* (2013.01); *H04N 21/27* (2013.01); *H04N 21/472* (2013.01); *H04N 21/4722* (2013.01); *H04N 21/47202* (2013.01); *H04N 21/47214* (2013.01); *H04N 21/482* (2013.01); *H04N 21/4882* (2013.01)

(58) Field of Classification Search
None
See application file for complete search history.

(56) References Cited

U.S. PATENT DOCUMENTS 5,844,560 A * 12/1998 Crutcher et al. ............... 715/840
7,793,326 B2 * 9/2010 McCoskey et al. ............. 725/91

(Continued)

*Primary Examiner* — Fernando Alcon

(57) ABSTRACT

An exemplary method includes a media service provider system 1) detecting a request for information about a media program, 2) providing, for display on a display screen in response to the request, an information view for the media program that includes the information about the media program, 3) providing, for display in the information view, a first user-selectable icon associated with one or more options for accessing the media program by way of a first media distribution channel, and 4) providing, for display in the information view, a second user-selectable icon positioned adjacent to the first user-selectable icon and associated with one or more options for accessing the media program by way of a second media distribution channel that is different from the first media distribution channel. Corresponding systems and methods are also described.

25 Claims, 9 Drawing Sheets

(56) References Cited

U.S. PATENT DOCUMENTS

| | | | |
|---|---|---|---|
| 8,028,233 B1 * | 9/2011 | Florschuetz et al. | 715/716 |
| 8,332,748 B1 * | 12/2012 | Karam | 715/246 |
| 8,584,165 B1 * | 11/2013 | Kane et al. | 725/44 |
| 8,627,379 B2 * | 1/2014 | Kokenos et al. | 725/60 |
| 2003/0069964 A1 * | 4/2003 | Shteyn et al. | 709/225 |
| 2004/0117831 A1 * | 6/2004 | Ellis et al. | 725/53 |
| 2006/0155575 A1 * | 7/2006 | Gross | 705/1 |
| 2009/0249412 A1 * | 10/2009 | Bhogal et al. | 725/104 |
| 2011/0214148 A1 * | 9/2011 | Gossweiler et al. | 725/46 |
| 2012/0233640 A1 * | 9/2012 | Odryna et al. | 725/45 |

* cited by examiner

SYSTEMS AND METHODS FOR PRESENTING MEDIA PROGRAM ACCESSIBILITY INFORMATION

RELATED APPLICATIONS

The present application claims priority under 35 U.S.C. §119(e) to U.S. Provisional Patent Application No. 61/732,247, filed Nov. 30, 2012. The contents of the provisional patent application are hereby incorporated by reference in their entirety.

BACKGROUND INFORMATION

There are diverse ways for people to find and consume media programs. For example, a user wanting to watch a media program such as a movie may utilize a traditional video distribution service such as a video rental or purchase service ("video service") to find, access, and watch the movie. The video service may allow the user to rent or purchase a physical copy of the movie from a local video store or media vending kiosk, or to rent or purchase a digital copy of the movie through an online video service, which may stream or download the digital copy of the movie to a user computing device for playback to the user.

Such a video service typically provides a user of the service with tools for discovering and accessing a media program, such as user interface tools that provide information about the media program and facilitate access to the media program by the user. However, there remains room for new and/or improved user interface tools and/or features that may further benefit users of the service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods for presenting media program accessibility information are disclosed. In certain examples, systems and methods described herein may provide an information view for a media program. The information view may include one or more user interface elements arranged in a manner that may benefit a user of a media program distribution service. Elements of the information view may be especially beneficial to a user of a robust media program distribution service that distributes media programs in a variety of different ways. In certain examples, for instance, the information view may be a single-page view of a graphical user interface ("GUI") and may include a first icon associated with a set of one or more options related to streaming or downloading the media program and a second icon, positioned adjacent to the first icon, that is associated with a set of one or more options related to reserving the media program for retrieval from one of a plurality of media vending kiosks. The first and/or second sets of options may be dynamically selected for association with the first and/or second icons based on one or more media program access factors, in any of the ways described herein. In certain examples, the information view may further include an availability indicator that indicates an availability of the media program, which may be selected based on one or more media program access factors in any of the ways described herein. Additionally or alternatively, in certain examples, the information view may further include content indicating a preferred media program access option, which may be selected based on one or more media program access factors in any of the ways described herein. The information view may include additional information and/or options associated with the media program. Such content of the information view may facilitate a convenient, intuitive, and/or efficient assessment by the user of the various options available for accessing the media program and a determination by the user of which option best fits the preferences of the user.

These and/or additional or alternative benefits and/or advantages that may be provided by one or more of the exemplary systems and methods described herein will be made apparent herein. Exemplary systems and methods for presenting media program accessibility information and implementations thereof, as well as exemplary GUI views (e.g., exemplary information views for media programs) will now be described in reference to the accompanying drawings.

Figure 1:
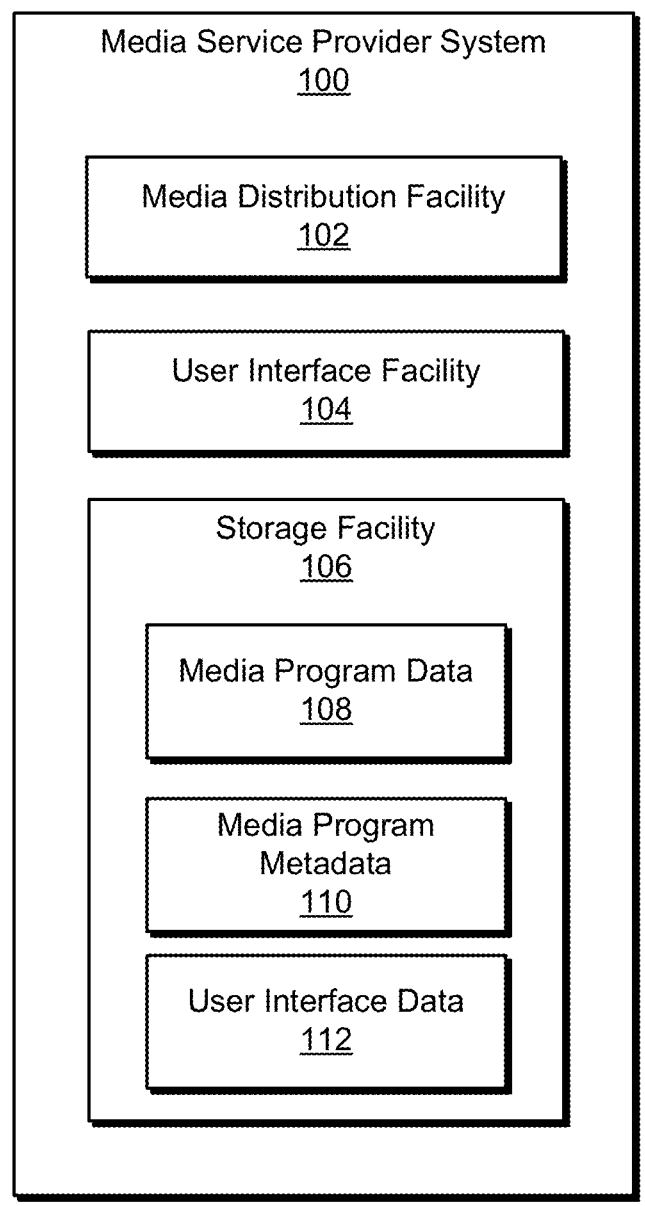
FIG. 1 illustrates an exemplary media service provider system according to principles described herein.

FIG. 1 illustrates an exemplary media service provider system 100 ("system 100"). System 100 may be configured to facilitate discovery, access, and/or consumption of media programs by one or more users. For example, system 100 may be configured to provide a media program distribution service ("media service") to one or more end-users of the media service (e.g., one or more subscribers to the media service). System 100 may be associated with (e.g., operated by) a provider of the media service ("service provider"). Through the media service, an end user of the media service may discover, access, and/or consume media programs distributed by system 100.

As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of a media program distribution service. Such media programs that are made available for user consumption by the media program distribution service may be accessed and/or played back by an appropriately configured user computing device (e.g., a media player device) for presentation to the user.

As shown in FIG. 1, system 100 may include, without limitation, a media distribution facility 102 ("distribution facility 102"), a user interface facility 104, and a storage facility 106 selectively and communicatively coupled to one another. The facilities may be communicatively coupled one to another by any suitable communication technologies.

It will be recognized that although facilities 102-106 are shown to be separate facilities in FIG. 1, any of those facilities may be combined into a single facility or split into additional facilities as may serve a particular implementation. Additionally or alternatively, one or more of the facilities 102-106 may be omitted from and external to system 100 in other implementations. Facilities 102-106 will now be described in more detail.

Storage facility 106 may be configured to store media program data 108 representative of media programs that may be distributed by media distribution facility 102, media program metadata 110 for the media programs (e.g., metadata and/or enriched metadata descriptive of the media programs) represented by media program data 108, and user interface data 112 generated and/or used by user interface facility 104 to provide one or more user interfaces, such as described herein. Storage facility 106 may maintain additional or alternative data as may serve a particular implementation.

Distribution facility 102 may be configured to facilitate distribution of media programs to users of a media service provided by system 100. Distribution facility 102 may be configured to facilitate distribution of media programs in any way and/or form that is suitable to facilitate access and consumption of the media programs by users of the media service.

In certain examples, distribution facility 102 may be configured to distribute media programs by way of multiple different media distribution channels. For example, distribution facility 102 may be configured to distribute media programs by way of a digital media distribution channel and a physical media distribution channel. The digital media distribution channel may include on-demand streaming and/or downloading of data representative of the media programs from a media service provider server system to one or more user computing systems by way of a network (e.g., an Internet Protocol ("IP") wide area network such as the Internet). The physical media distribution channel may include distribution of physical media that hold data representative of the media programs. For example, the physical media distribution channel may include a media vending kiosk-based distribution channel through which physical media, such as digital versatile discs ("DVDs"), BLU-RAY discs ("BDs"), and/or other physical computer-readable copies of media programs are distributed to users.

In certain examples, the distribution facility 102 may be configured to provide users of the media service with access to media programs by way of a plurality of different media distribution models ("distribution models"). Each distribution model may define a particular way that an end user of the media service may gain access to media programs through the media service. Thus, a user of the media service may be able to gain access to media programs by way of multiple different distribution models.

In certain examples, the distribution models may include multiple distribution-channel-based models such as a digital media distribution model that corresponds to the digital media distribution channel and a physical media distribution model that corresponds to the physical media distribution channel.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media service (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined by a service provider to be different for a rental and a purchase of the media program, in which case each of the rental and the purchase may be a different transaction-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

In certain examples, the distribution models may include media-format-based distribution models for gaining access to media programs in specific media formats. For example, the media distribution facility 102 may be configured to distribute media programs in a plurality of media formats, such as a high definition ("HD") media format, a standard definition ("SD") media format, a BD media format, and a DVD media format, each of which may be a different media-format-based distribution model.

In certain examples, media-format-based distribution models may be associated with specific media distribution channels. For example, the HD and SD media formats may be associated with a digital media distribution channel and/or a physical media distribution channel, and the BD and DVD media formats may be associated with a physical media distribution channel.

Distribution facility 102 may be configured to provide users of a media service with access to media programs by way of any of the different distribution models described herein, or by way of any combination or sub-combination thereof. As an example, in certain implementations, distribution facility 102 may provide access to media programs by way of a set of distribution models that includes a first distribution model associated with subscription-based access to media programs by way of a digital media distribution channel, a second distribution model associated with transactional-based access to media programs by way of the digital media distribution channel, and a third distribution model associated with either or both subscription-based and transactional-based access to media programs by way of a physical media distribution channel. In certain examples, these distribution models may be referred to as a "subscription" digital distribution model, an "on-demand" or "rent/buy" digital distribution model, and a "physical" or "kiosk" distribution model.

Figure 2:
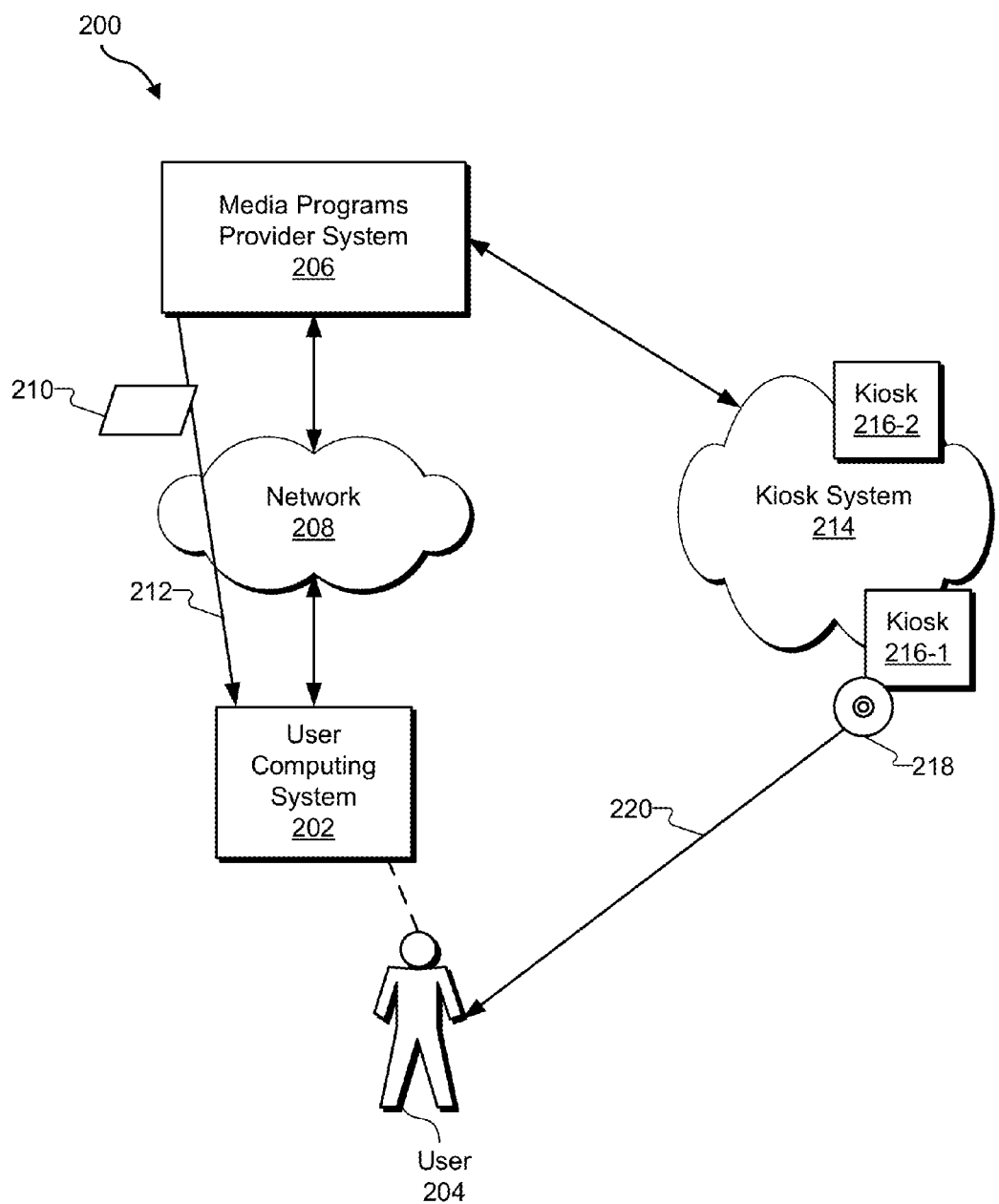
FIG. 2 illustrates an exemplary media distribution configuration in which the system of FIG. 1 may be implemented according to principles described herein.

FIG. 2 illustrates an exemplary media distribution configuration 200. Components of system 100 may be implemented by one or more of the elements of the configuration 200 shown in FIG. 2. As shown, the configuration 200 may include a user computing system 202 associated with a user 204, who may be an end user of the media service provided by system 100. User computing system 202 may be in communication with a media programs provider system 206 ("provider system 206"), which may include one or more computing devices (e.g., server devices remotely located from user computing system 202 and/or operated by a provider of the media service).

User computing system 202 and provider system 206 may communicate using any communication platforms and technologies suitable for transporting data (e.g., media programs data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing system 202 and provider system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing system 202 and provider system 206. Communications between user computing system 202 and provider system 206 may be transported using any one of the above-listed networks, or any combination or sub-combination of the above-listed networks. Alternatively, user computing system 202 and provider system 206 may communicate in another way such as by direct connections between user computing system 202 and provider system 206.

The configuration 200 may support distribution of media programs, through the media service provided by the system 100, by way of multiple different media distribution channels, such as a digital media distribution channel and a physical media distribution channel. As shown, provider system 206 may distribute media programs such as by distributing digital data 210 representative of a media program to user computing system 202 by way of a digital media distribution channel 212, which may be included as part of or utilized by a digital media distribution model. This distribution may utilize any suitable media streaming and/or downloading technologies (e.g., Internet media streaming and/or downloading technologies) to support delivery of digital data representative of media programs to user computing system 202 by way of network 208.

As further shown in FIG. 2, provider system 206 may be in communication with a media vending kiosk system 214, which may include one or more geographically distributed media vending kiosks 216 (e.g., media vending kiosks 216-1 and 216-2) configured to vend physical copies of media programs, such as a physical copy 218 of a media program, to user 204 by way of a physical media distribution channel 220, which may be included as part of or utilized by a physical media distribution model. For example, user 204 may visit a location of media vending kiosk 216-1 and, through the media vending kiosk 216-1, obtain the physical copy 218 of the media program, which may be experienced by the user in a variety of different ways, for example, by inserting the physical copy 218 into a media disc player device such as a DVD or BD player device. In certain examples, one or more of the vending kiosks 216 may include automated media vending machines.

User computing system 202 may be configured for use by user 204 associated with (e.g., operating) the user computing system 202 to access the media service provided by system 100. For example, the user 204 may utilize the user computing system 202 to access one or more user interfaces provided by system 100 as part of and/or for accessing the media service, and to present the user interfaces for use by the user 204 to discover, access, and consume media programs distributed by way of the digital media distribution channel 210 and/or the physical media distribution channel 220 as part of the media service.

A user computing system 202 may include one or more user computing devices associated with the user 204. Examples of such devices include, without limitation, a media player computing device (e.g., a media disc player device such as a DVD or BD player device), a display device, a set-top box device, a digital video recording ("DVR") device, a computer, a tablet computer, a smart phone device, and any other device capable of accessing the media service and/or media programs provided by system 100 by way of the media service.

In certain examples, a user computing system 202 may include a first user computing device (e.g., a primary display device) configured to play back media programs and a second user computing device (e.g., a secondary or companion display device) configured to display a graphical user interface that may compliment or be used together with the playback of the media programs by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 202 may include any combination of user computing devices or a single user computing device configured to perform any of the user computing system and/or device operations described herein.

Returning to FIG. 1, user interface facility 104 may be configured to provide a user interface through which users may access and interface with the media service provided by system 100 to discover, access, and/or consume media programs. The user interface may be in any suitable form. For example, user interface facility 104 may be configured to provide a website, a client application user interface (e.g., a user interface provided by a client application such as a "mobile app" installed and running on user computing system 202), a media player user interface, a graphical user interface, and/or any other form of user interface configured to facilitate user interaction with the media service. User interface facility 104 may be configured to provide any of the exemplary user interfaces illustrated herein, including one or more user interface views that include user-selectable icons respectively corresponding to different media program distribution channels.

Figure 3:
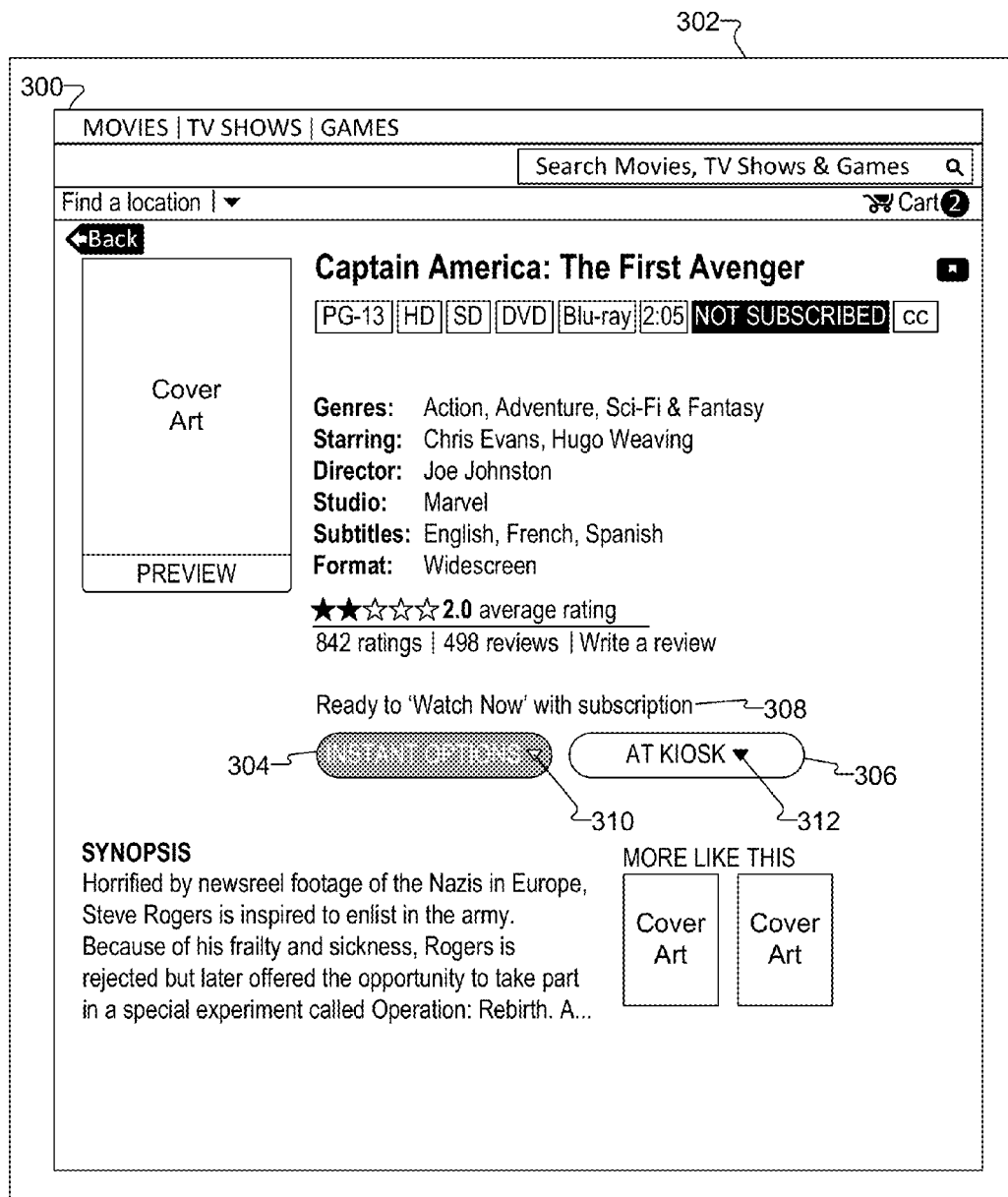
FIGS. 3-6 illustrate exemplary user interface views according to principles described herein.

To illustrate, FIG. 3 depicts an information view 300 of a graphical user interface that may be provided by the user interface facility 104. The information view 300 may be provided for display on a display screen 302 associated with the user computing system 202. In certain examples, user interface facility 104 may provide the information view 300 for display in response to a user request for information about a particular media program, such as a movie titled "Captain America: The First Avenger." For example, user interface facility 104 may detect a user request for information about a media program, received through a media user interface, and respond to the request by providing the information view 300 for display.

The information view 300 may include information about a media program. For instance, the information view 300 may be dedicated (e.g., exclusively dedicated) to providing information about and/or related to the media program. As shown in FIG. 3, the information view 300 may include a cover art image for the movie titled "Captain America: The First Avenger," as well as other information about the movie such as a title and synopsis of the movie and information regarding the genre, cast, director, studio, ratings, and available formats of the movie.

The media program that is the subject of the information view 300 may be available in multiple different media formats through the media service provided by system 100. For example, the movie may be available to rent or buy in an SD format or an HD format by way of digital media distribution channel 212, and may be available in DVD format or BD format for rental or purchase from the media vending kiosks 216 by way of physical media distribution channel 220. Each of the available media formats may be a different option available to the user 204 for accessing the movie by way of the digital media distribution channel 212 or the physical media distribution channel 220.

The information view 300 may include content configured to facilitate convenient and/or intuitive user discovery and/or assessment of the different options available for accessing a media program through the media service. Additionally or alternatively, the content may be configured to facilitate convenient and/or intuitive user selection of one or more of the options through which to access the media program for consumption.

For example, the information view 300 may include graphical icons respectively associated with the various media distribution channels and/or access options through which the media program is accessible through the media service. In FIG. 3, the information view 300 includes a first user-selectable icon 304 associated with a first media distribution channel and a second user-selectable icon 306 associated with a second media distribution channel.

The first user-selectable icon 304 and the second user-selectable icon 306 may be positioned relative to one another within the information view 300 in a manner that is configured to facilitate convenient and/or intuitive user understanding and/or assessment of the available access options for the media program. For example, as shown in FIG. 3, the first user-selectable icon 304 and the second user-selectable icon 306 may be positioned adjacent to each other. As used herein, the expression "adjacent to" may refer to the icons 304 and 306 being in close proximity to each other or overlaid at least partially on top of each other. For example, the icons and/or indicators may be adjacent to each other by being side-by-side to each other (e.g., horizontally side-by-side, vertically side-by-side one above the other, diagonally side-by-side to each other) or at least partially on top of each other. In the embodiment illustrated in FIG. 3, the first user-selectable icon 304 and the second user-selectable icon 306 are positioned adjacent to each other in a side-by-side configuration and with no intervening graphical objects positioned between them. However, the example shown in FIG. 3 is illustrative only, and the relative positioning of the first user-selectable icon 304 and the second user-selectable icon 306 one to another may be in any suitable manner as may suit a particular implementation.

The first user-selectable icon 304 and the second user-selectable icon 306 may be associated with different sets of options for accessing a media program. In the example illustrated in FIG. 3, the first user-selectable icon 304 is associated with one or more options for accessing a media program (e.g., the "Captain America" movie) by way of a first media distribution channel such as the digital media distribution channel 212, and the second user-selectable icon 306 is associated with one or more options for accessing the media program by way of a second media distribution channel such as the physical media distribution channel 220. In some examples, the options associated with the first user-selectable icon 304 may be referred to as "instant options" for instantly accessing the media program by way of the digital media distribution channel 212, and the options associated with the second user-selectable icon 306 may be referred to as "kiosk options" for accessing the media program by way of the physical media distribution channel 220. The user interface facility 104 may select a set of options to associate with the first user-selectable icon 304 or the second user-selectable icon 306 based on one or more media program access factors, as described further below.

Figure 4:
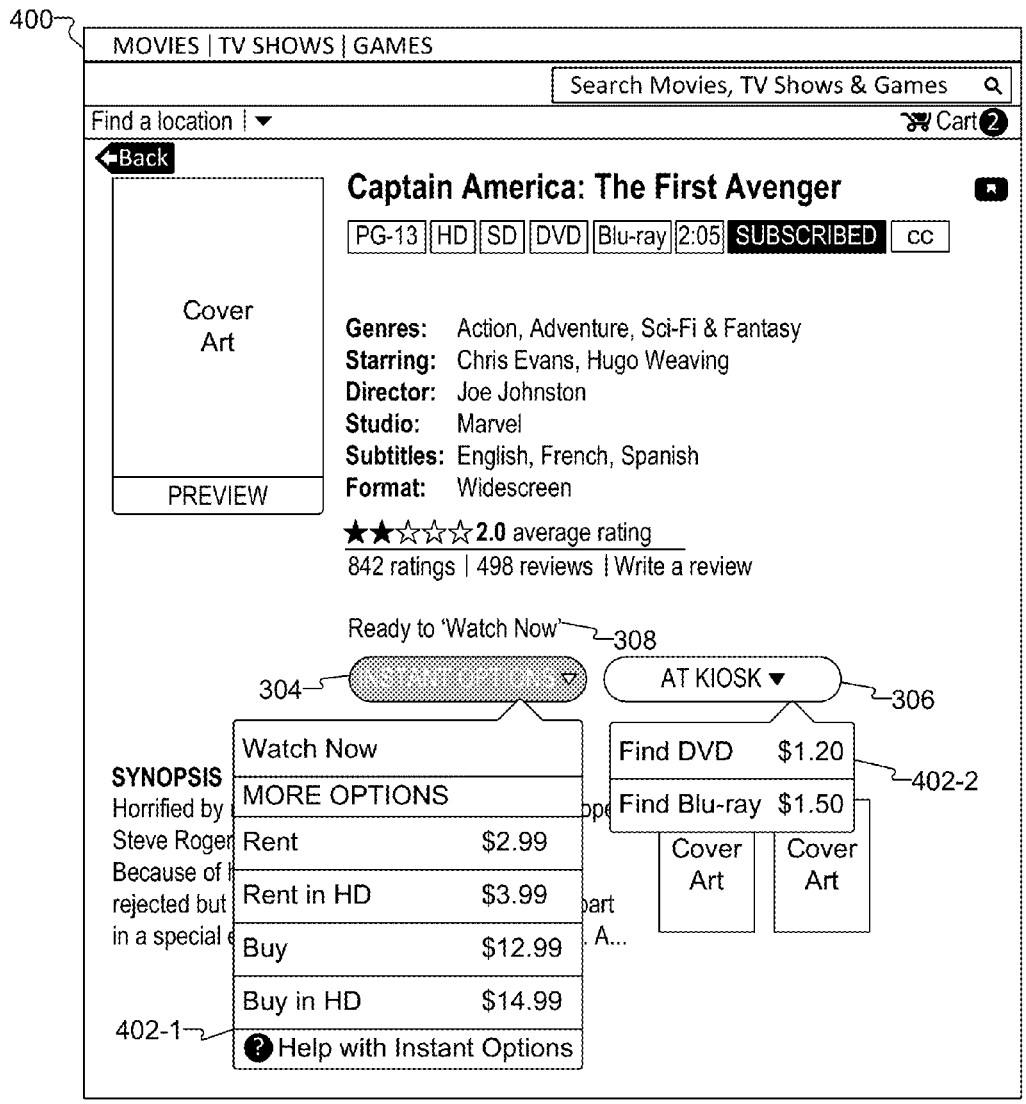

The user interface facility 104 may present one or more of the media program access options associated with the first user-selectable icon 304 and/or the second user-selectable icon 306 within a user interface view. In certain examples, the user interface facility 104 may present the options through a drop down menu associated with the first user-selectable icon 304 and/or a drop down menu associated with the second user-selectable icon 306. FIG. 4 illustrates an exemplary information view 400 in which options for accessing the media program are presented by way of drop down menus 402 (e.g., drop down menus 402-1 and 402-2). Drop down menu 402-1 may include options for accessing the media program by way of the digital media distribution channel 212, and drop down menu 402-2 may include options for accessing the media program by way of the physical media distribution channel 220.

The user interface facility 104 may be configured to present and/or hide the drop down menus 402 in response to any suitable user input. As an example, the user interface facility 104 may present drop down menu 402-1 in response to a user selection of at least a portion of the first user-selectable icon 304 (e.g., in response to a user selection of the first user-selectable icon or a drop down menu indicator portion (e.g., an arrow symbol) of the first user-selectable icon), and may present drop down menu 402-2 in response to a user selection of at least a portion of the second user-selectable icon 306 (e.g., in response to a user selection of the second user-selectable icon or a drop down menu indicator portion (e.g., an arrow symbol) of the second user-selectable icon). The user interface facility 104 may be configured to hide drop down menu 402-1 in response to a selection of at least a portion of the first user-selectable icon 304 or a selection of at least a portion of the user-selectable icon 306 being made while drop down menu 402-1 is displayed. Similarly, the user interface facility 104 may be configured to hide drop down menu 402-2 in response to a selection of at least a portion of the second user-selectable icon 306 or a selection of at least a portion of the user-selectable icon 304 being made while drop down menu 402-2 is displayed. Accordingly, the drop down menus 402 may be concurrently presented (e.g., as shown in FIG. 4) or individually presented in the information view 400 depending on the user selections of the user-selectable icons 304 and/or 306 made by the user 204 in the user interface.

As another example, a user selection of at least a portion of the first user-selectable icon 304 may cause both the first drop down menu 402-1 and the second drop down menu 402-2 to be presented concurrently. Similarly, a user selection of at least a portion of the second user-selectable icon 306 may cause both the first drop down menu 402-1 and the second drop down menu 402-2 to be presented concurrently. In addition, a user selection of at least a portion of either of the first user-selectable icon 304 and the second user-selectable icon 306 made while the first drop down menu 402-1 and the second drop down menu 402-2 are presented may cause both of the first drop down menu 402-1 and the second drop down menu 402-2 to be hidden. A concurrent presentation of the drop down menus 402 may facilitate convenient assessment of access options across multiple media distributions channels.

The drop down menu 402-1 may include options mapped to different ways that the media program may be accessed by way of the digital media distribution channel 212. For example, the options included in the drop down menu 402-1 may be mapped to one or more media distribution models by way of which the media program is accessible by way of the digital media distribution channel 212. In the illustrated example, the access options in the drop down menu 402-1 include a "Watch Now" option, a "Rent" option, a "Rent in HD" option, a "Buy" option, and a "Buy in HD" option. In some examples, the drop down menu 402-1 may also include a help option that may, upon selection by the user 204, provide further information regarding the available instant options for accessing the media program through the digital media distribution channel 212. Other options may be included as part of drop down menu 402-1 as may suit a particular implementation.

The "Watch Now" option may be selected by the user 204 to initiate instant access and playback of the media program through, for example, a subscription-based and digital channel-based distribution model. The user 204 may select either the "Rent" or the "Rent in HD" options to make the media program available for a limited time through, for example, a transactional-based and digital channel-based distribution model in either the SD media format or the HD media format. The "Buy" and "Buy in HD" options may be selected by the user 204 to purchase, for example, through a transactional-based and digital channel-based distribution model, either an SD or an HD copy of the media program that can be viewed by the user 204 whenever desired. In response to a user selection of one of the options in the drop down menu 402-1, the media program may be provided or otherwise made accessible to the user 204 through the digital media distribution channel 212 by way of a media distribution model associated with the selected option.

The drop down menu 402-2 may include options mapped to different ways that the media program may be accessed by way of the physical media distribution channel 220. For example, the options included in the drop down menu 402-2 may be mapped to one or more distribution models by way of which the media program is accessible by way of the physical media distribution channel 220. In the illustrated example, the access options in the drop down menu 402-2 include a "Find DVD" option and a "Find BLU-RAY" option. In some examples, the drop down menu 402-2 may also include a help option that may, upon selection by the user 204, provide further information regarding the available options for accessing the media program through the physical media distribution channel 220. Other options may be included as part of drop down menu 402-2 as may suit a particular implementation.

The "Find DVD" option may be selected by the user 204 to find a DVD copy of a media program at one or more media vending kiosks 216 through, for example, either a subscription-based and physical channel-based distribution model or a transactional-based and physical channel-based distribution model. Similarly, the "Find BLU-RAY" option may be selected by the user 204 to find a BD copy of the media program from one or more media vending kiosks 216 through, for example, either a subscription-based and physical channel-based distribution model or a transactional-based and physical channel-based distribution model. After selecting either the "Find DVD" option or the "Find BLU-RAY" option, the user interface facility 104 may inform the user 204 in any suitable manner of one or more vending kiosks 216 where a DVD copy or a BD copy of the media program is currently available for vending or reservation. The user 204 may then be able to select a particular vending kiosk 216 and reserve a DVD copy or a BD copy of the media program to be retrieved by the user 204 at a later time.

In certain examples, the user interface facility 104 may select, and provide for display on display screen 302, a preferred media program access option that may be determined by the user interface facility 104. The preferred media program access option may represent a preferred manner by which the user 204 may access the media program. The preferred media program access option may be presented to the user 204 by way of a graphical object provided on or adjacent to one of the first user-selectable icon 304 and the second user-selectable icon 306. The preferred media access option and/or the graphical object may be selected, by the user interface facility 104 for inclusion in the information view, based on one or more of media program access factors, as described further below.

Figure 5:
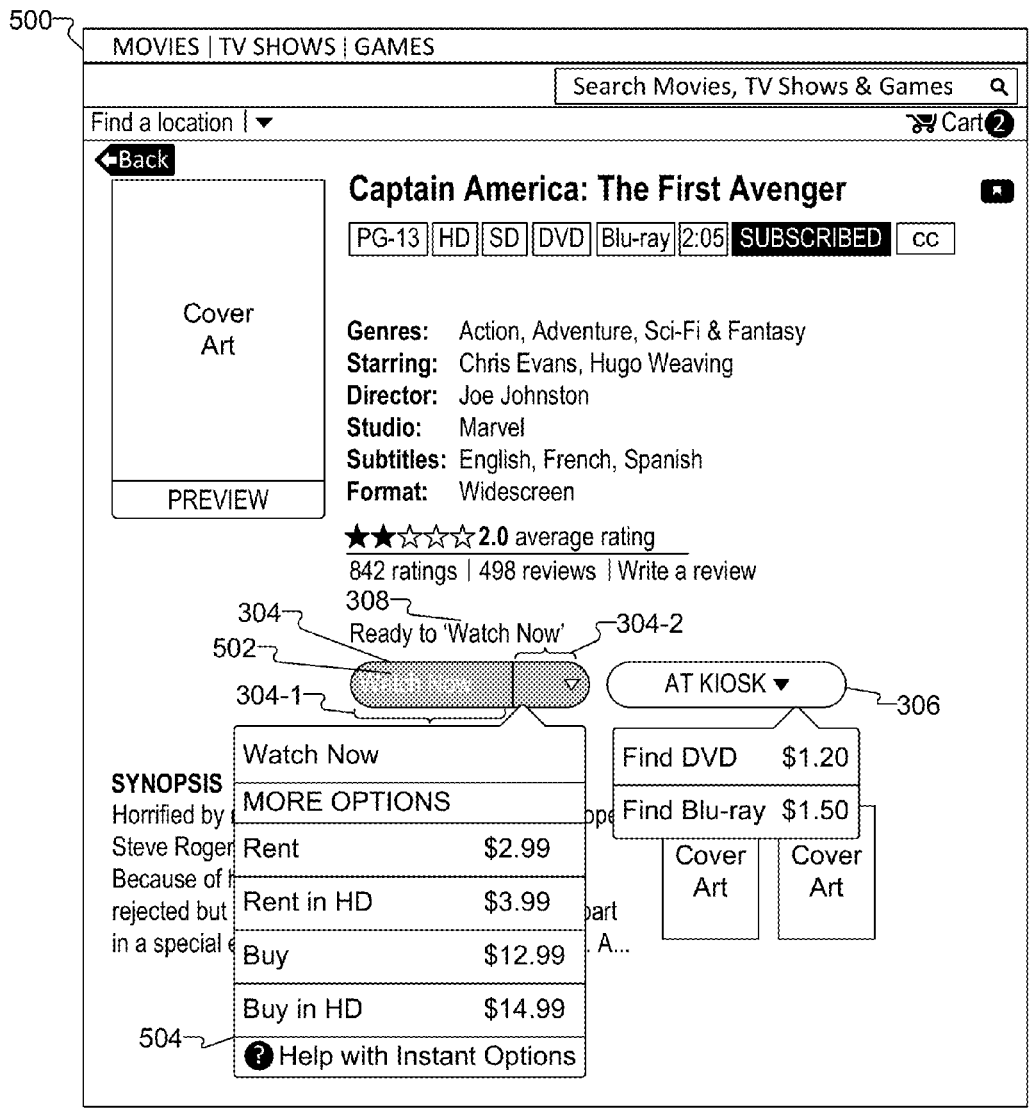

FIG. 5 illustrates an exemplary information view 500 in which a preferred media program access option is provided by way of a graphical object 502 (e.g., a "Watch Now" option) that is positioned on part of the first user-selectable icon 304. The "Watch Now" option may be selected as the preferred media access option based on, for example, a subscription status of the user 204. The graphical object 502 may be configured to be selected with a single user input to initiate access to the media program by way of the preferred media program access option. The user 204, by selecting the "Watch Now" graphical object 502, can initiate playback of a media program, such as the movie illustrated in FIG. 5, through a single user input.

The exemplary graphical object 502 of FIG. 5 is specific to options and distribution models associated with the digital media distribution channel 212. Other graphical objects may be provided that are specific to options and distribution models associated with the physical media distribution channel 220 (see, e.g., the description of FIG. 6). In addition, other graphical objects may be provided in different examples as may suit a particular implementation.

In certain examples, one or both of the first user-selectable icon 304 and the second user-selectable icon 306 may include a split functionality to facilitate access to the various options for accessing the media program. For example, the first user-selectable icon 304 illustrated in FIG. 5 has a first portion 304-1 on the left side that is mapped to the preferred media program access option (e.g., the portion with the "Watch Now" graphical object 502) and a second portion 304-2 on the right side that is mapped to a drop down menu illustrating one or more options for accessing the media program by way of the digital media distribution channel 212. With the split functionality, the user 204 may either select, through a single user input on the first portion 304-1 of the first user-selectable icon 304, the preferred media program access option or may, through a user input on the second portion 304-2 of the first user-selectable icon 304, access the drop down menu 504 to view other options for accessing the media program. The drop down menu 504 may be presented in any suitable manner described herein.

Figure 6:
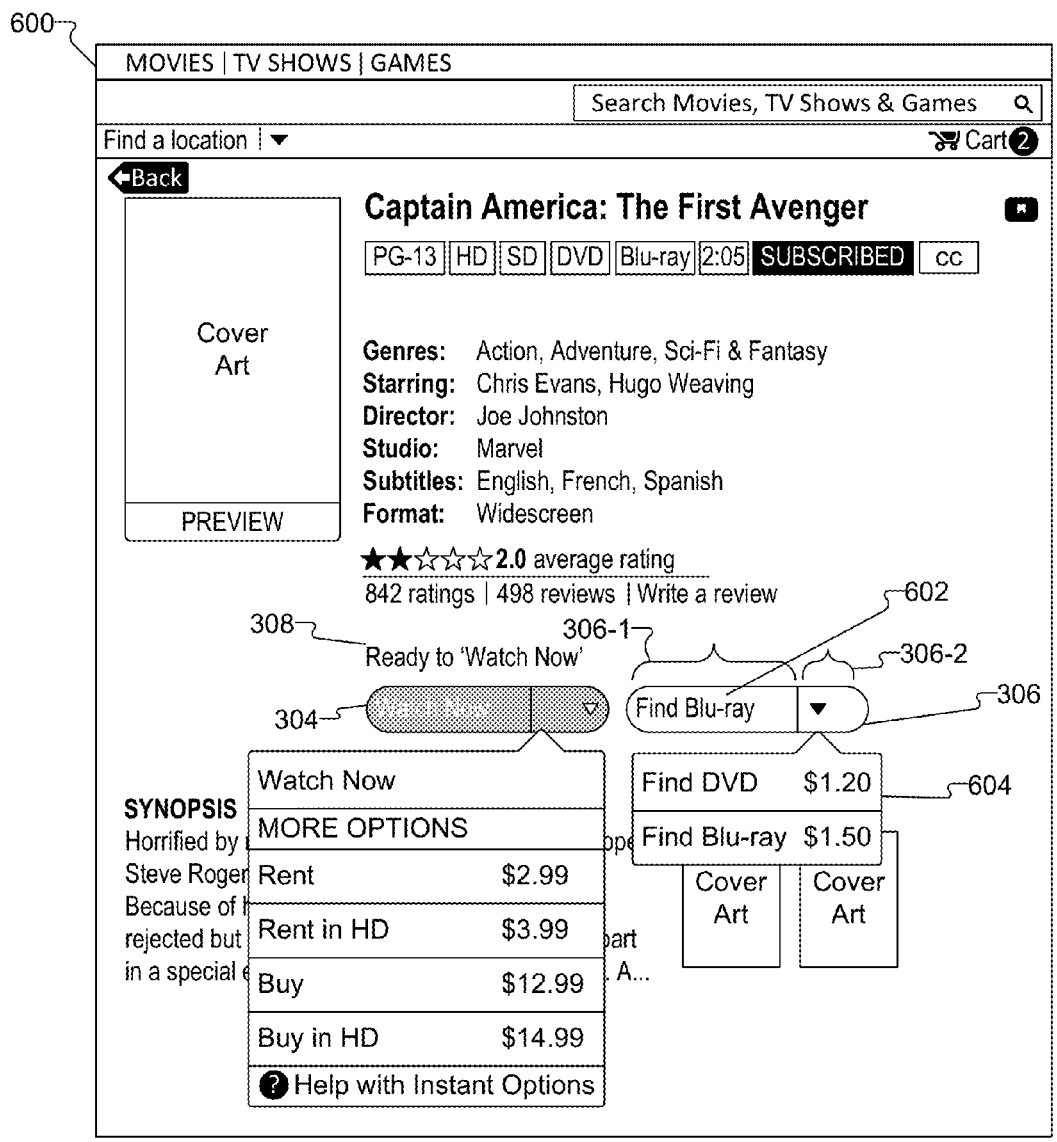

A graphical object indicating a preferred media program access option that is specific to distribution models options associated with the physical media distribution channel 220 may be provided on or adjacent to the second user-selectable icon 306. FIG. 6 illustrates an embodiment where a preferred media program access option is presented to the user 204 by way of a graphical object 602 (e.g., a "Find BLU-RAY" option) positioned on the second user-selectable icon 306. In the example illustrated in FIG. 6, the user 204 may, through a single user input on "Find BLU-RAY," locate a BD copy of a media program either at one of the media vending kiosks 216 or at a pre-selected preferred kiosk location if a preferred kiosk location has been established by the user 204. The second user-selectable icon 306 illustrated in FIG. 6 may also include a split functionality in which the second user-selectable icon 306 has a first portion 306-1 on the left side that is mapped to the preferred media program access option (e.g., the "Find BLU-RAY" graphical object 602) and a second portion 306-2 on the right side that is mapped to a drop down menu 604. The drop down menu 605 may illustrate one or more options for accessing the media program by way of the physical media distribution channel 212 in any manner described herein.

As shown in FIGS. 3-6, an information view may include an availability indicator 308. The availability indicator 308 may be any type of indicator that indicates an availability of the media program as determined by the user interface facility 104 based on one or more media program access factors, as described further below. In the embodiment illustrated in FIG. 3, the availability indicator 308 is a textual notification indicating a suggested action that the user 204 may take with respect to the media program. The availability indicator 308 may be provided adjacent to one of the first user-selectable icon 304 and the second user-selectable icon 306.

In certain examples, the user interface facility 104 may be configured to dynamically select content to be included in an information view for a media program. For example, the user interface facility 104 may select, based on one or more media program access factors, a set of options to be associated with the first user-selectable icon 304 and/or the second user-selectable icon 306 (e.g., the options to be included in the drop down menus 402) of an information view for a media program, a preferred media program access option to be indicated in an information view for a media program, and/or an availability indicator 308 to be included in an information view for a media program. Examples of such media program access factors and how the factors may be used by the user interface facility 104 as the bases for selection of such user interface content for inclusion in an information view for a media program will now be described with reference to Table 1, shown below.

Table 1 provides examples of various combinations of "media program content status," "user status," and "device status" information that may be associated with a particular "instant options list" and availability indicator 308. Each row in Table 1 indicates a particular "instant options list" and a particular availability indicator 308 that may be selected by the user interface facility 104 based on a particular combination of "media program content status," "user status," and "device status" information provided in the row. The "media program content status" information in Table 1 may refer to a status of the media program and how the media program may be accessible to the user 204 (e.g., whether the media program is rented, purchased, and/or is accessible through a current subscription, a subscription upgrade, and/or a free trial). The "user status" information in Table 1 may refer to information related to a subscription status of the user 204. The "device status" information in Table 1 may refer to a type of device, a particular operating system used by a device, and/or other characteristic of a device that may access the media program. The "instant options lists" provided in Table 1 may refer to any set of options that may be provided in the information view, for example, as the preferred media access option and/or in the drop down menus 402. The "availability indicator" information provided in Table 1 may refer to particular content or other values of availability indicator 308. In certain examples, certain information, such as the availability indicator and/or the instant options list, may not be available or applicable (e.g., may not be applicable for a particular combination of media program content status, user status, and device status information), in which case the lack of availability or applicability may be represented as "n/a" in Table 1. The examples of availability indicators and instant options lists depicted in Table 1 are illustrative only. Other availability indicators and/or instant options lists may be defined in other embodiments.

TABLE 1

| Media Program Content Status | User Status | Device Status | Instant Options List | Availability Indicator |
|---|---|---|---|---|
| Media program in current subscription | Subscriber | N/A | Instant Options Watch Now Rent Rent HD Buy Buy HD | Ready to 'Watch Now' |
| Media program in basic subscription | Non-Subscriber (Free Trial Eligible) | N/A | Instant Options Watch Now Rent Rent HD Buy Buy HD | Ready to 'Watch Now' with Free Trial |
| Media program in basic subscription | Non-Subscriber (not Free Trial Eligible) | N/A | Instant Options Watch Now Rent Rent HD Buy Buy HD | Ready to 'Watch Now' with subscription |
| Subscription upgrade required | Subscriber | N/A | Instant Options Watch Now Rent Rent HD Buy Buy HD | Ready to 'Watch Now' with upgrade |
| Media program in higher tier subscription | Non-Subscriber (Free Trial Eligible) | N/A | Instant Options Watch Now Rent Rent HD Buy Buy HD | Ready to 'Watch Now' with subscription |
| Media program in higher | Non-Subscriber | N/A | Instant Options | Ready to 'Watch Now' |

TABLE 1-continued

| Media Program Content Status | User Status | Device Status | Instant Options List | Availability Indicator |
|---|---|---|---|---|
| tier subscription | (not Free Trial Eligible) | | Watch Now Rent Rent HD Buy Buy HD | with subscription |
| Is rented | Subscriber | N/A | Instant Options Watch Now Buy Buy HD | "Expires in <# days>, <# hours>" |
| Is rented | Non-Subscriber (Free Trial Eligible) | N/A | Instant Options Watch Now Buy Buy HD | "Expires in <# days>, <# hours>" |
| Is rented | Non-Subscriber (not Free Trial Eligible) | N/A | Instant Options Watch Now Buy Buy HD | "Expires in <# days>, <# hours>" |
| Is purchased; No blackout | Subscriber | N/A | Watch Now | Ready to 'Watch Now' |
| Is purchased; No blackout | Non-Subscriber (Free Trial Eligible) | N/A | Watch Now | Ready to 'Watch Now' |
| Is purchased; No blackout | Non-Subscriber (not Free Trial Eligible) | N/A | Watch Now | Ready to 'Watch Now' |
| Is purchased; Blackout | Subscriber | N/A | Not Available | Instant options temporarily unavailable Note that user may select a 'Not Available' button and get more information about blacked out media programs |
| Is purchased; Blackout | Non-Subscriber (Free Trial Eligible) | N/A | Not Available | Instant options temporarily unavailable Note that user may select the 'Not Available' button and get more information about blacked out media programs |
| Is purchased; Blackout | Non-Subscriber (not Free Trial Eligible) | N/A | Not Available | Instant options temporarily unavailable Note that user may select the 'Not Available' button and get more information about blacked out media programs |
| Is video on demand ("VOD") only, not in any subscription package (not rented or purchased by user) | Subscriber | N/A | Instant Options Rent Rent HD Buy Buy HD | programs Rent or Buy to 'Watch Now' |
| Is VOD only, not in any subscription package (not rented or purchased by user) | Non-Subscriber (Free Trial Eligible) | N/A | Instant Options Rent Rent HD Buy Buy HD | Rent or Buy to 'Watch Now' |
| Is VOD only, not in any subscription package (not rented or purchased by user) | Non-Subscriber (not Free Trial Eligible) | N/A | Instant Options Rent Rent HD Buy Buy HD | Rent or Buy to 'Watch Now' |
| Is purchased; Is downloaded | Subscriber | (Mobile/Tablet only) | Watch Now | N/A |
| Is purchased; Is downloaded | Non-Subscriber (Free Trial Eligible) | (Mobile/Tablet only) | Watch Now | N/A |
| Is purchased; Is downloaded | Non-Subscriber (not Free Trial Eligible) | (Mobile/Tablet only) | Watch Now | N/A |
| Is purchased; Is downloading; Watch now may play streaming version and prompt to pause download | Subscriber | (Mobile/Tablet only) | Watch Now | N/A |
| Is purchased; Is downloading; Watch now may play streaming version and prompt to pause download | Non-Subscriber (Free Trial Eligible) | (Mobile/Tablet only) | Watch Now | N/A |
| Is purchased; Is downloading; Watch now may play streaming version and prompt to pause download | Non-Subscriber (not Free Trial Eligible) | (Mobile/Tablet only) | Watch Now | N/A |
| Media program available in subscription (or available to non-subscribers due to previous active rental or purchase) | Subscriber | iOS | Watch Now | Ready to 'Watch Now' |
| Media program available in subscription | Non-Subscriber (Free Trial Eligible) | iOS | N/A | Non-Subscribers may not be able to get to |

TABLE 1-continued

| Media Program Content Status | User Status | Device Status | Instant Options List | Availability Indicator |
|---|---|---|---|---|
| | | | | information views of subscription media programs |
| Media program available in subscription | Non-Subscriber (not Free Trial Eligible) | iOS | N/A | Non-Subscribers may not be able to get to information views of subscription media programs |
| Subscription upgrade required | Subscriber | iOS | Watch Now | Subscription Upgrade Required |
| Subscription upgrade required | Non-Subscriber (Free Trial Eligible) | iOS | Watch Now | Subscription Required |
| Is active VOD | Subscriber | iOS | Watch Now | Ready to 'Watch Now' |
| Is active VOD | Non-Subscriber (Free Trial Eligible) | iOS | Watch Now | Ready to 'Watch Now' |
| Is active VOD | Non-Subscriber (not Free Trial Eligible) | iOS | Watch Now | Ready to 'Watch Now' |

As mentioned, the exemplary instant options lists and availability indicators 308 provided in Table 1, as well as any other information that may be provided in an information view of a media program, may be based on one or more media program access factors. The exemplary media program access factors (and combinations thereof) shown in Table 1 are illustrative only. Additional and/or alternative media program access factors (and combinations thereof) may be used in other examples as bases for selection, by the user interface facility 104, of content to be included in an information view for a media program. Media program access factors may include one or more of a user account subscription status, a media program content status, user device capabilities, user preferences, user activity patterns, and available formats of the media program. Any combination or sub-combination of the media program access factors described herein may be the basis for selecting the user interface content provided for display in an information view for the media program.

In certain examples, the user interface facility 104 may select at least some of the user interface content based on a user account subscription status. The user account subscription status may include any of the user status information listed in Table 1 and/or any other information associated with a subscription status of the user 204 as may suit a particular implementation. In one example set forth in Table 1, the user interface facility 104 may determine that the user 204 is a subscriber, but that a subscription upgrade may be made to access the media program. In such an example, the user interface facility 104 may select "Ready to 'Watch Now' with upgrade" as the availability indicator 308. The user interface facility 104 may also, in such an example, select the "Watch Now" option as the preferred media access option, which option may be configured to facilitate initiation of a subscription upgrade process in response to a user selection of the "Watch Now" preferred media access option in the information view for the media program. After completion of the subscription upgrade process, the user interface facility 104 may update the options provided for display in the information view by, for example, changing the availability indicator 308 from "Ready to 'Watch Now' with upgrade" to "Ready to 'Watch Now.'" In this manner, the user interface facility 104 may be configured to dynamically update the user interface content that is provided for display in the information view based on a change in the user account subscription status.

In another example set forth in Table 1, the user interface facility 104 may determine that the user 204 is not a subscriber, but that the particular media program represented in the information view is currently rented by the user 204. In such an example, the user interface facility 104 may select "Expires in 1 day, 4 hours" as the availability indicator 308. The user interface facility 104 may also, in such an example, select the "Watch Now" option as the preferred media access option, which may initiate playback of the media program through a user selection of the "Watch Now" option. In view of the rented status of the media program, the user interface facility 104 may modify the options that may be included in the drop down menu 402-1 by removing the "Rent" option from the drop down menu 402-1. However, if the media program was rented in an SD format, the user interface facility 104 may still include a "Rent in HD" option in the drop down menu 402-1. If the media program was rented in the highest quality media format available, the user interface facility 104 may omit all rental options from the drop down menu 402-1. For example, if the media program was rented in an HD format, the user interface facility 104 may omit a "Rent in HD" option and a "Rent in SD" option from the drop down menu 402-1.

Similarly, in view of a purchased status of a media program, the user interface facility 104 may modify the options that may be included in the drop down menu 402-1 such as by removing one or more of the "Purchase" and "Rent" options from the drop down menu 402-1. However, if the media program was purchased in an SD format, the user interface facility 104 may still include a "Purchase in HD" option in the drop down menu 402-1. If the media program was purchased in the highest quality media format available, the user interface facility 104 may omit all purchased and rental options from the drop down menu 402-1. For example, if the media program was purchased in an HD format, the user interface facility 104 may omit a "Rent in HD" option, a "Rent in SD" option, a "Purchase in HD" option, and "Purchase in SD" option from the drop down menu 402-1.

In certain examples in which a user has rented or purchased a digital format copy of a media program, options for accessing the media program by way of a physical media distribution channel such as from a vending kiosk may still be included in drop down menu 402-2 in case the user wants to access a physical copy of the media program. For example, the user may want to bring a physical copy of the media program on a trip or pick up a physical copy of the media program from a vending kiosk while traveling.

Other examples of user interface content that may be selected, by the user interface facility 104, for inclusion in the information view for the media program based on a particular user account subscription status are illustrated in Table 1.

In certain examples, the user interface facility 104 may select at least some of the user interface content based on a media program content status. The media program content status may include any of the media program content status information provided in Table 1 as well as any other information that may indicate how the media program may be accessible to the user 204. In one example illustrated in Table 1, the media program content status may indicate that the media program is accessible through a current subscription of the user 204. Based on such a media program content status, the user interface facility 104 may select "Ready to 'Watch Now'" as the availability indicator 308, may select "Watch Now" as the preferred media access option, and may provide the options "Watch Now," "Rent," "Rent HD," "Buy," and "Buy HD," for example, in the drop down menu 402-1. Other examples of user interface content that may be selected, by the user interface facility 104, for inclusion in the information view for the media program based on a particular media program content status are illustrated in Table 1.

In certain examples, an option to access a media program by way of subscription access will be prioritized, by the user interface facility 104, over other options whenever subscription access is available. For example, if a media program is available through a subscription, through transactional rental or purchase, and through a vending kiosk, the user interface facility 104 may give priority to the subscription access when selecting user interface content. This may help steer users to subscription-based access of media programs, which may provide best overall value to the users.

In certain examples, if a media program has been purchased by a user or is available to the user through a subscription, the user interface facility 104 may provide a "watch now" option as a primary selectable option for accessing the media program. Other options may be provided as secondary options. For example, the user interface facility 104 may select the "watch now" option as the preferred media program access option and/or as the availability indicator 308 in an information view, such as is represented in one or more examples shown in Table 1.

In certain examples, the user interface facility 104 may select at least some of the user interface content based on one or more user device capabilities. The user device capabilities may include any capabilities of a device or combinations of devices (e.g., a television, a computer, a mobile communications device, a DVD player, a BD player, etc.) through which the user 204 may access the media program. The user device capabilities may also include information regarding the type of the device (e.g., whether the device is a mobile device) and/or an operating system of the user device such as those indicated in the device status information included in Table 1. To illustrate, the user interface facility 104 may detect, for example, that a user device is a mobile device and that the media program is purchased and downloaded to the mobile device. Accordingly, the user interface facility 104, based on such a detection, may omit the availability indicator 308 and may provide "Watch Now" as the preferred media access option without including other options in the drop down menus 402. In another example, the user interface facility 104 may determine that a user playback device does not have BD format capabilities. Accordingly, the user interface facility 104 may omit BD rental/purchase options from drop down menu 402-2. In another example, the user interface facility 104 may detect that a user device has only SD media format processing capabilities. Accordingly, in such a situation, the availability indicator 308 may read "Ready to 'Watch Now' with a subscription" instead of "Ready to 'Watch Now' in HD with a subscription." It is understood that any other suitable device capabilities or combinations of device capabilities may be taken into consideration, by the user interface facility 104, in other examples when determining the user interface content to include in an information view for the media program.

In certain examples, the user interface facility 104 may select at least some of the user interface content based on one or more user preferences and/or one or more user activity patterns. The user preference(s) may include any information that may be provided by the user 204 regarding how the user 204 prefers to access/experience the media program. The user activity pattern(s) may include any pattern of activity of the user 204 that is detected in association with the user accessing and/or experiencing one or more media programs. For example, the user 204 may indicate through a user preference control interface for the user interface facility 104 a preference that only HD media format options be presented to the user. Accordingly, based on this preference, user interface facility 104 may modify the availability indicator 308 and/or remove or omit the "Rent" and "Buy" options from the drop down menu 402-1 illustrated in FIG. 4. Similarly, the user interface facility 104 may monitor user activity patterns and may, for example, provide for display only HD media format suggestions when the user activity patterns indicate that the user 204 prefers experiencing media programs in an HD media format. Additionally or alternatively, the user 204 may, through a user preference control user interface, indicate that the media vending kiosk 216-2 is a preferred kiosk location. As a result, the user interface facility 104 may modify the content associated with the second user-selectable icon 306 based on the current availability of media programs at the preferred kiosk location.

In another example, the user 204 may specify a geographic area in which the user 204 prefers to receive availability information indicating the availability of media programs from one or more media vending kiosks 216. For example, the user 204 may indicate a preference to receive availability information from only the media vending kiosks 216 that are within a 10 mile radius of the user 204. Accordingly, the user interface facility 104 may remove or omit the "Rent DVD" option from being displayed, for example, in drop down menu 402-2 if there is no physical copy of the media program currently available at a media vending kiosk 216 located within that 10 mile radius.

In certain examples, the user interface facility 104 may select at least some of the user interface content based on an available format of the media program. To illustrate, in some examples, the available format of the media program may include any format of a copy of the media program (e.g., DVD format, BD format, etc.) that may be available to rent and/or purchase from one or more media vending kiosks 216. For example, the user interface facility 104 may determine that there are no BD copies of the media program currently available from a number of media vending kiosks 216 within a certain geographical area (e.g., within 10 miles of the user 204) specified by the user 204. Accordingly, the user interface facility 104 may modify the drop down menu 402-2 illustrated in FIG. 4 to remove or omit the "Find BLU-RAY" option in such a situation. The user interface facility 104 may also modify the availability indicator 308 based on the lack of availability. Additionally or alternatively, the user interface facility 104 may determine that there are no DVD copies of the media program currently available from a number of media vending kiosks 216 within the certain geographical area. Accordingly, the user interface facility 104 may modify the dropdown menu 402-2 illustrated in FIG. 4 to remove or omit the "Find DVD" option. If no DVD copy or BD copy of the media program is available at the media vending kiosk 216 within the certain geographical area, the drop down menu 402-2 may indicate that the media program is "Not Available," or user interface facility 104 may provide an indication in any suitable manner of one or more other media vending kiosks 216 outside the certain geographical area where a DVD copy or BD copy of the media program is available.

In certain examples, the user interface facility 104 may prioritize certain media formats over others within user interface content. For example, if a media program is available for rental or purchase in both SD and HD formats, the user interface facility 104 may provide user interface content in which the HD format is prioritized, such as by providing the HD format as a primary option and either providing the SD format as a secondary option or omitting the SD format option from the user interface content.

The examples explained above are for illustrative purposes only and are not exhaustive of how the media program access factors may be utilized by the user interface facility 104 to select the user interface content to be provided in an information view for a media program. Additional or alternative media program access factors, or any suitable combination or sub-combination of media program access factors, may be used by the user interface facility 104 to select user interface content to be provided in an information view for a media program.

Figure 7:
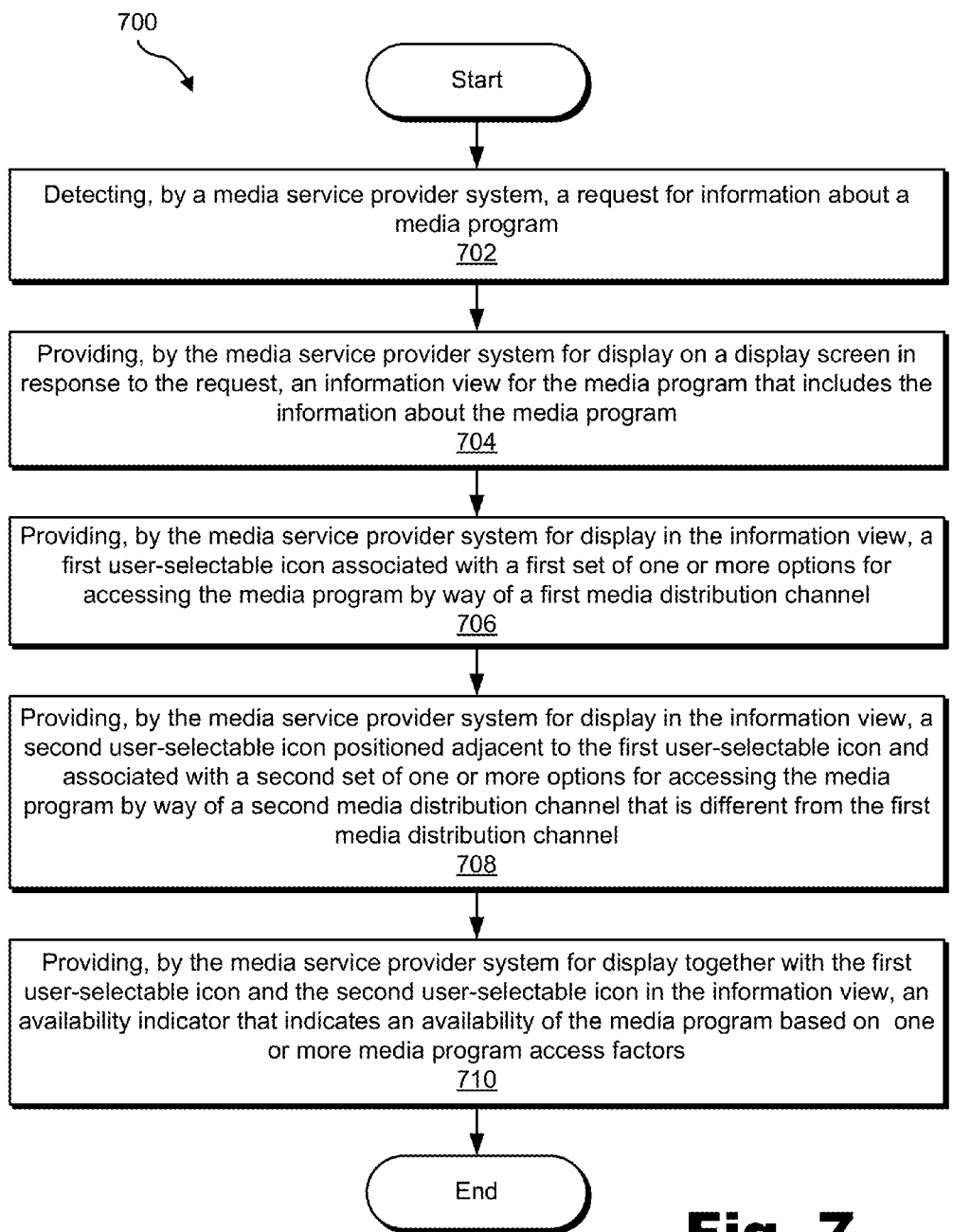
FIG. 7 illustrates an exemplary method for presenting media program accessibility information according to principles described herein.

FIG. 7 illustrates an exemplary method for presenting media program accessibility information. While FIG. 7 illustrates exemplary steps according to one embodiment, other embodiments may omit, add to, reorder, combine, and/or modify any of the steps shown in FIG. 7. In certain embodiments, one or more of the steps shown in FIG. 7 may be performed by one or more components of the media service system 100 and/or implementations thereof.

In step 702, a media service provider system may detect a request for information about a media program, such as described herein.

In step 704, the media service provider system may provide, for display on a display screen in response to the request, an information view for the media program that includes the information about the media program, such as described herein.

In step 706, the media service provider system may provide, for display in the information view, a first user-selectable icon associated with a first set of one or more options for accessing the media program by way of a first media distribution channel, such as described herein. In certain examples, the providing of the first user-selectable icon may include the media service system dynamically selecting the first set of one or more options based on one or more media program access factors and associating the first set of one or more options with the first user-selectable icon, such as described herein.

In step 708, the media service provider system may provide, for display in the information view, a second user-selectable icon positioned adjacent to the first user-selectable icon and associated with a second set of one or more options for accessing the media program by way of a second media distribution channel that is different from the first media distribution channel, such as described herein. In certain examples, the providing of the second user-selectable icon may include the media service system dynamically selecting the second set of one or more options based on one or more media program access factors and associating the second set of one or more options with the first user-selectable icon, such as described herein.

In step 710, the media service provider system may provide, for display together with the first user-selectable icon and the second user-selectable icon in the information view, an availability indicator that indicates an availability of the media program based on one or more media program access factors, such as described herein.

Figure 8:
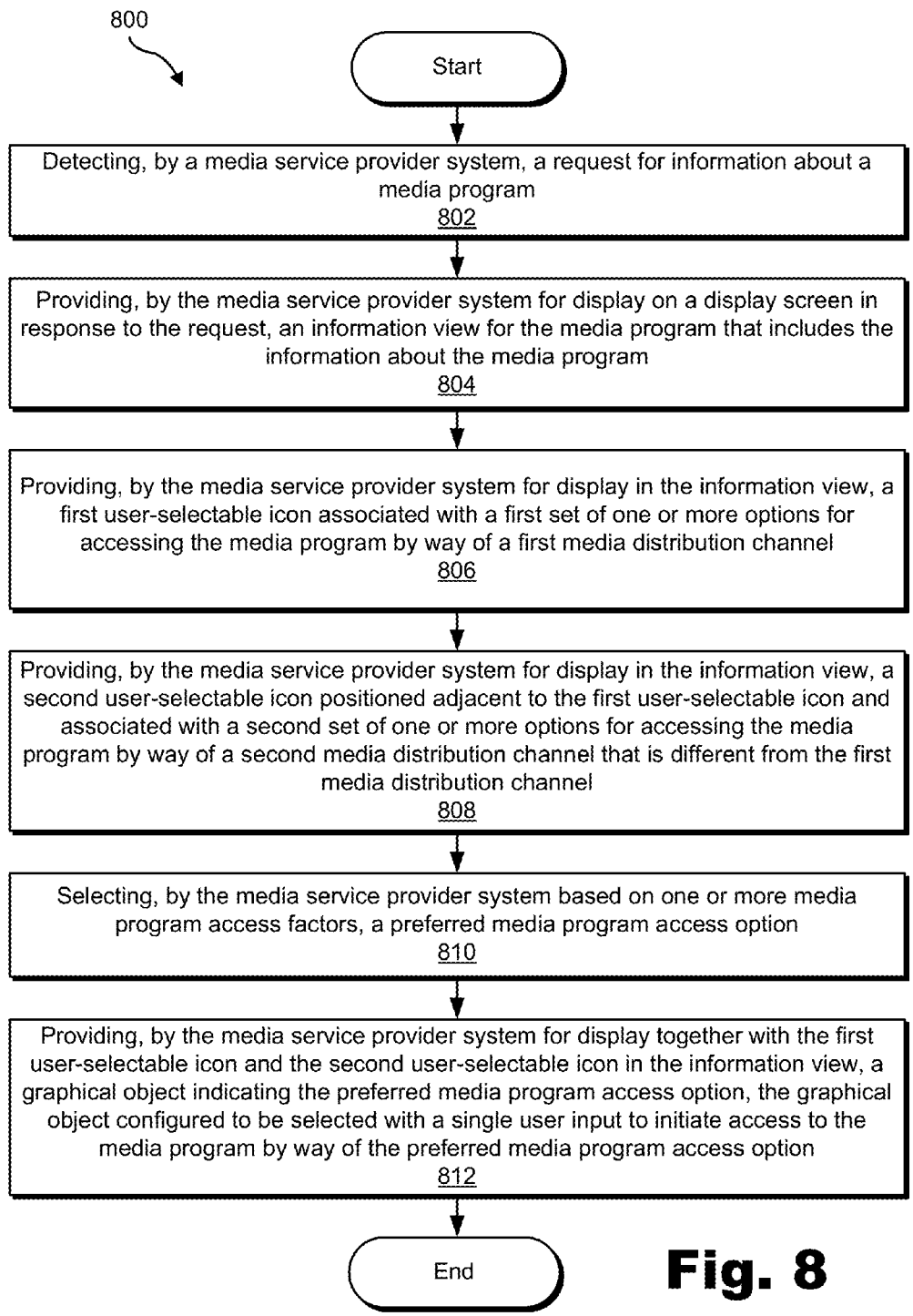
FIG. 8 illustrates another exemplary method for presenting media program accessibility information according to principles described herein.

FIG. 8 illustrates an exemplary method for presenting media program accessibility information. While FIG. 8 illustrates exemplary steps according to one embodiment, other embodiments may omit, add to, reorder, combine, and/or modify any of the steps shown in FIG. 8. In certain embodiments, one or more of the steps shown in FIG. 8 may be performed by one or more components of the media service system 100 and/or implementations thereof.

In step 802, a media service provider system may detect a request for information about a media program, such as described herein.

In step 804, the media service provider system may provide, for display on a display screen in response to the request, an information view for the media program that includes the information about the media program, such as described herein.

In step 806, the media service provider system by provide, for display in the information view, a first user-selectable icon associated with a first set of one or more options for accessing the media program by way of a first media distribution channel, such as described herein.

In step 808, the media service provider system may provide, for display in the information view, a second user-selectable icon positioned adjacent to the first user-selectable icon and associated with a second set of one or more options for accessing the media program by way of a second media distribution channel that is different from the first media distribution channel, such as described herein.

In step 810, the media service provider system may select, based on one or more media program access factors, a preferred media program access option, such as described herein.

In step 812, the media service provider system may provide, for display together with the first user-selectable icon and the second user-selectable icon in the information view, a graphical object indicating the preferred media program access option, the graphical object configured to be selected with a single user input to initiate access to the media program by way of the preferred media program access option, such as described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 9:
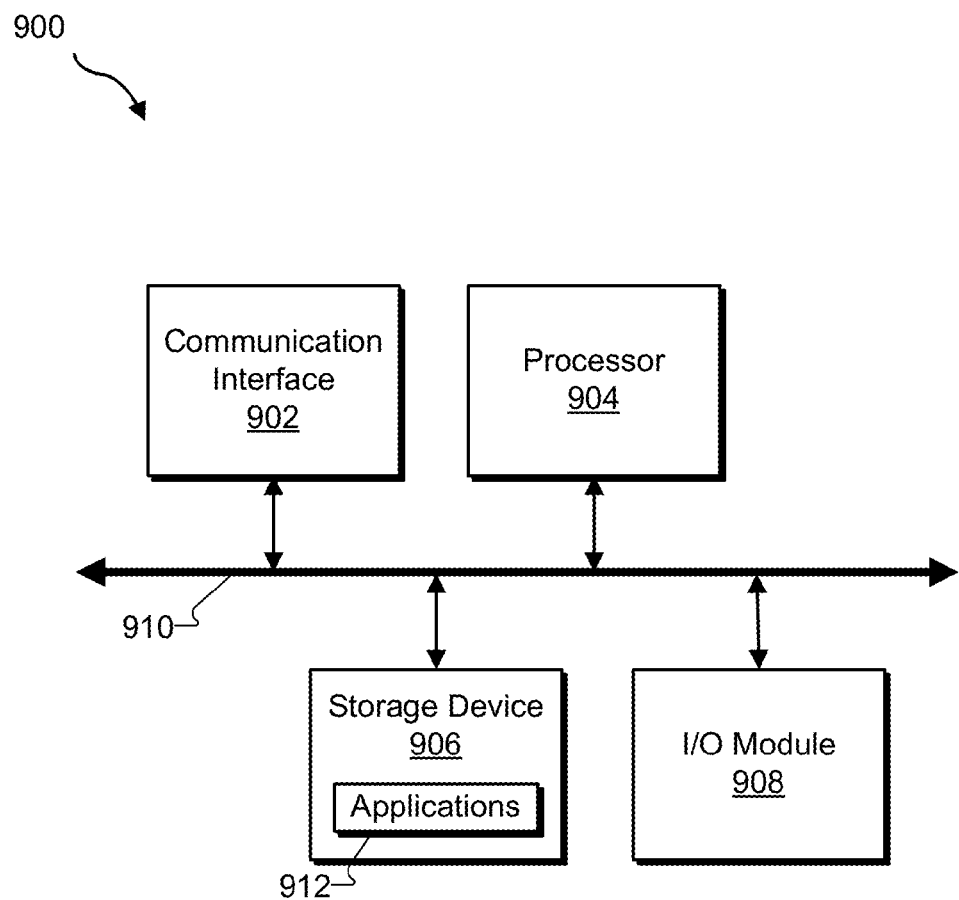
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output (I/O) module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. In at least one embodiment, communication interface 902 may provide a direct connection between system 100 and one or more of provisioning systems via a direct link to a network, such as the Internet. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the subsystems described herein may be implemented by or within one or more components of computing device 900. For example, one or more applications 912 residing within storage device 906 may be configured to direct processor 904 to perform one or more processes or functions associated with the media distribution facility 102, or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
    detecting, by a media service provider system, a request for information about a media program;
    providing, by the media service provider system for display on a display screen in response to the request, an information view for the media program that includes the information about the media program;
    providing, by the media service provider system for display in the information view, a first user-selectable icon associated with a first set of one or more options for accessing the media program by way of a first media distribution channel, wherein the first set of one or more options for accessing the media program by way of the first media distribution channel is accessible by way of a first menu associated with the first user-selectable icon;

providing, by the media service provider system for display in the information view, a second user-selectable icon positioned adjacent to the first user-selectable icon and associated with a second set of one or more options for accessing the media program by way of a second media distribution channel that is different from the first media distribution channel, wherein the second set of one or more options for accessing the media program by way of the second media distribution channel is accessible by way of a second menu associated with the second user-selectable icon; and concurrently providing, by the media service provider system for display in the information view, the first menu and the second menu in response to a user selection of at least one of the first user-selectable icon and the second user-selectable icon, wherein the concurrently providing results in concurrent display of both the first set of one or more options and the second set of one or more options across both the first media distribution channel and the second media distribution channel.

2. The method of claim 1, wherein the providing of the first user-selectable icon comprises dynamically selecting the first set of one or more options based on one or more media program access factors and associating the first set of one or more options with the first user-selectable icon.

3. The method of claim 2, wherein the one or more media program access factors include one or more of a user account subscription status, a media program content status, a user device capability, and an available media format of the media program.

4. The method of claim 2, further comprising providing, by the media service provider system for display together with the first user-selectable icon and the second user-selectable icon in the information view, an availability indicator that indicates an availability of the media program based on the one or more media program access factors.

5. The method of claim 4, wherein the availability indicator is a textual notification indicating a suggested action for a user to take with respect to the media program.

6. The method of claim 5, wherein the availability indicator is provided for display adjacent to one of the first user-selectable icon and the second user-selectable icon in the information view.

7. The method of claim 4, further comprising:
detecting, by the media service provider system, a user selection of one of a first option from the first menu, a second option from the second menu, and the availability indicator; and
facilitating, by the media service provider system in response to the user selection, user access to the media program.

8. The method of claim 1, wherein the first media distribution channel is a digital media distribution channel through which the media program is digitally distributed.

9. The method of claim 8, wherein the first menu comprises a drop down menu and the first set of one or more options for accessing the media program by way of the first media distribution channel include at least one of an option to rent the media program, an option to buy the media program, and an option for subscription access to the media program.

10. The method of claim 1, wherein the second distribution channel is a kiosk-based distribution channel through which the media program is accessible to a user by way of a kiosk that vends a physical copy of the media program.

11. The method of claim 10, wherein:
the physical copy of the media program comprises at least one of a first format of computer-readable disc and a second format of computer readable disc; and
the second menu comprises a drop down menu and the second set of one or more options for accessing the media program by way of the second media distribution channel include at least one of an option to find the first format of computer-readable disc and an option to find the second format of computer-readable disc at an available kiosk location.

12. The method of claim 1, embodied as computer-executable instructions on at least one non-transitory computer-readable medium.

13. A method comprising:
detecting, by a media service provider system, a request for information about a media program;
providing, by the media service provider system for display on a display screen in response to the request, an information view for the media program that includes the information about the media program;
providing, by the media service provider system for display in the information view, a first user-selectable icon associated with a first set of one or more options for accessing the media program by way of a first media distribution channel, wherein the first set of one or more options for accessing the media program by way of the first media distribution channel is accessible by way of a first menu associated with the first user-selectable icon;
providing, by the media service provider system for display in the information view, a second user-selectable icon positioned adjacent to the first user-selectable icon and associated with a second set of one or more options for accessing the media program by way of a second media distribution channel that is different from the first media distribution channel, wherein the second set of one or more options for accessing the media program by way of the second media distribution channel is accessible by way of a second menu associated with the second user-selectable icon;
selecting, by the media service provider system based on one or more media program access factors, a first preferred media program access option;
providing, by the media service provider system for display together with the first user-selectable icon and the second user-selectable icon in the information view, a first graphical object indicating the first preferred media program access option, the first graphical object configured to be selected with a single user input to initiate access to the media program by way of the first preferred media program access option,
wherein the first user-selectable icon includes a split functionality in which a first portion of the first user-selectable icon is mapped to the first preferred media program access option and a second portion of the first user-selectable icon is mapped to a the first menu; and
concurrently providing, by the media service provider system for display in the information view, the first menu and the second menu in response to a user selection of at least one of the second portion of the first user-selectable icon and the second user-selectable icon, wherein the concurrently providing results in concurrent display of both the first set of one or more options and the second set of one or more options across both the first media distribution channel and the second media distribution channel.

14. The method of claim 13, wherein the one or more media program access factors include one or more of a user account subscription status, a media program content status, a user device capability, and an available format of the media program.

15. The method of claim 13, wherein the providing of the first graphical object indicating the first preferred media program access option comprises:
selecting, based on the one or more media program access factors, the first preferred media program access option from the first set of one or more options for accessing the media program by way of the first media distribution channel; and
providing the first graphical object for display as part of the first user-selectable icon.

16. The method of claim 13, further comprising:
selecting, by the media service provider system based on one or more media program access factors, a second preferred media program access option; and
providing, by the media service provider system for display together with the second user-selectable icon in the information view, a second graphical object indicating the second preferred media program access option, the second graphical object configured to be selected with another single user input to initiate access to the media program by way of the second preferred media program access option,
wherein the providing of the second graphical object indicating the second preferred media program access option comprises:
selecting, based on the one or more media program access factors, the second preferred media program access option from the second set of one or more options for accessing the media program by way of the second media distribution channel; and
providing the second graphical object for display as part of the second user-selectable icon.

17. The method of claim 13, wherein the first media distribution channel is a digital media distribution channel through which the media program is digitally distributed.

18. The method of claim 13, wherein the first menu comprises a drop down menu.

19. The method of claim 13, wherein the first set of one or more options for accessing the first media distribution channel includes at least one of an option to rent the media program, an option to buy the media program, and an option for subscription access to the media program.

20. The method of claim 13, wherein the first preferred media program access option includes a watch now option that, in response to a receipt of the single user input selecting the watch now option, initiates a playback of the media program on the display screen.

21. The method of claim 16, wherein the second user-selectable icon includes a split functionality in which a first portion of the second user-selectable icon is mapped to the second preferred media program access option and a second portion of the second user-selectable icon is mapped to the second menu.

22. The method of claim 13, wherein the second distribution channel is a media vending kiosk-based distribution channel through which the media program is accessible to a user by way of a kiosk that vends a physical copy of the media program.

23. The method of claim 13, embodied as computer-executable instructions on at least one non-transitory computer-readable medium.

24. A system comprising:
a processor; and
a user interface facility that directs the processor to
provide, in a graphical user interface ("GUI"), an information view for a media program, the information view including
information about the media program,
a first user-selectable icon associated with a first set of one or more options for accessing the media program by way of a first media distribution channel, wherein the first set of one or more options for accessing the media program by way of the first media distribution channel is accessible by way of a first menu associated with the first user-selectable icon, and
a second user-selectable icon positioned adjacent to the first user-selectable icon and associated with a second set of one or more options for accessing the media program by way of a second media distribution channel that is different from the first media distribution channel, wherein the second set of one or more options for accessing the media program by way of the second media distribution channel is accessible by way of a second menu associated with the second user-selectable icon; and
concurrently provide, for display in the information view in response to a user selection of at least one of the first user-selectable icon and the second user-selectable icon, the first menu and the second menu to result in concurrent display of both the first set of one or more options and the second set of one or more options across both the first media distribution channel and the second media distribution channel.

25. The method of claim 1, wherein the providing of the second user-selectable icon comprises dynamically selecting the second set of one or more options based on one or more media program access factors and associating the second set of one or more options with the second user-selectable icon.

\* \* \* \* \*